United States Patent
Li et al.

(10) Patent No.: US 9,036,534 B2
(45) Date of Patent: May 19, 2015

(54) METHOD AND APPARATUS FOR DATA PACKET RELAYING AND DATA PACKET DECODING

(75) Inventors: Ji Li, Shanghai (CN); Yonggang Wang, Shanghai (CN); Zhongji Hu, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 680 days.

(21) Appl. No.: 13/266,091

(22) PCT Filed: Apr. 27, 2009

(86) PCT No.: PCT/CN2009/000446
§ 371 (c)(1),
(2), (4) Date: Oct. 24, 2011

(87) PCT Pub. No.: WO2010/124408
PCT Pub. Date: Nov. 4, 2010

(65) Prior Publication Data
US 2012/0044858 A1 Feb. 23, 2012

(51) Int. Cl.
*H04W 88/04* (2009.01)
*H04L 1/00* (2006.01)
*H04L 1/06* (2006.01)

(52) U.S. Cl.
CPC .............. *H04W 88/04* (2013.01); *H04L 1/0045* (2013.01); *H04L 1/0076* (2013.01); *H04L 1/06* (2013.01); *H04L 2001/0097* (2013.01)

(58) Field of Classification Search
CPC ...................... H04M 13/1111; H04M 13/3784; H04M 13/45; H04B 7/14; H04B 7/15521; H04B 7/15592; H04W 88/04
See application file for complete search history.

(56) References Cited

U.S. PATENT DOCUMENTS

| | | | |
|---|---|---|---|
| 2008/0279182 A1* | 11/2008 | Hafeez et al. | 370/389 |
| 2009/0103472 A1 | 4/2009 | Ni et al. | |
| 2009/0268662 A1* | 10/2009 | Larsson et al. | 370/328 |
| 2010/0182946 A1* | 7/2010 | Ni et al. | 370/315 |
| 2012/0044858 A1* | 2/2012 | Li et al. | 370/315 |

FOREIGN PATENT DOCUMENTS

| | | |
|---|---|---|
| CN | 101064915 A | 10/2007 |
| CN | 101090304 A | 12/2007 |

(Continued)

OTHER PUBLICATIONS

English translation of WIPO publication WO 2008003311A1, retrieved from the Internet on Oct. 6, 2014.*

(Continued)

*Primary Examiner* — Benjamin H Elliott, IV
(74) *Attorney, Agent, or Firm* — Fay Sharpe LLP

(57) ABSTRACT

The present invention provides a technical scheme for forwarding data packets from one or more user terminals in a relay station, and a technical scheme for decoding the multiple data packets from the user terminals in a base station. The relay station performs network encoding on copies of multiple user terminal packets from one or more user terminals to obtain a network encoded data packet and sends the data packet to the base station. The base station receives copies of multiple user terminal packets from one or more user terminals, respectively, and a network encoded data packets from the relay station, and performs joint soft combining and decoding on them.

14 Claims, 8 Drawing Sheets

(56) References Cited

FOREIGN PATENT DOCUMENTS

| CN | 101420291 A | 4/2009 |
| EP | 1729435 A1 | 12/2006 |
| EP | 2202904 A1 | 6/2010 |
| WO | WO 2008108708 A1 * | 9/2008 |
| WO | WO 2009003311 A1 * | 1/2009 |

OTHER PUBLICATIONS

International Search Report for PCT/CN2009/000446 dated Feb. 4, 2010.
Zeitler et al., "Design of Network Coding Functions in Multihop Relay Networks", 2008 5$^{th}$ International Symposium on Turbo Codes and Related Topics, 2008 IEEE, pp. 249-254.
Alcatel Shanghai Bell et al., "Joint Analog Network Coding and Relay", 3GPP TSG-RAN WT RAN1#55; R1-084133; Agenda Item 11.5, 3$^{rd}$ Generation Partnership Project (3GPP), Prague, Czech Republic; Oct. 14, 2008; 20081110-20081114, [retrieved on Nov. 5, 2008], 7 pgs.
Alcatel Shanghai Bell et al., "Network Coded Relay and Its Chase Combining", 3GPP TSG-RAN WG1#58; R1-0093356; Agenda Item 15.3, 3$^{rd}$ Generation Partnership Project (3GPP), Shenzhen, China, Aug. 24-28, 2009; 20090819; [retrieved on Aug. 19, 2009], 11 pgs.
EP Search Report, EP09843820, Dated Dec. 12, 2013; Completed Dec. 5, 2013; Munich, DE, Examiner Aullo Navarro.
Yang et al., "Network Coding Over a Noisy Relay: a Belief Propagation Approach", ISIT 2007, Nice France, Jun. 24-29, 2007, pp. 801-804 (cited in corresponding Japanese Office Action, Jun. 2013).

* cited by examiner

METHOD AND APPARATUS FOR DATA PACKET RELAYING AND DATA PACKET DECODING

FIELD OF THE INVENTION

The present invention relates to a wireless relay communication network, more particularly, to data packet forwarding in a relay station and data packet decoding in a base station in the wireless relay communication network.

BACKGROUND OF THE INVENTION

In LTE-A wireless communication network, relay is considered as an important technical means to support increasing capacity and enlarging coverage range. In uplink relay, information from multiple user terminals needs to be relayed. Generally, information from each user terminal is respectively relayed to eNodeB node. For example, in FIG. 1, relay station 21 respectively relays data packets P1 and P2 respectively from user terminals 11 and 12 to eNodeB node 31. For the two data packets P1 and P2, resources comparable to the length of the two packets are required to carry them. Since radio resources of communication links are very limited in wireless communication network, it is necessary to apply some schemes for saving radio resources to perform relay.

SUMMARY OF THE INVENTION

Based on the technical background, the present invention provides a technical scheme for forwarding data packets from one or more user terminals in a relay station, and a technical scheme for joint soft combining and decoding the data packets from user terminals in a base station.

According to an embodiment of the present invention, a method of decoding data packets from user terminals in a base station of a wireless communication network is provided. The method comprises the following steps of: receiving copies of multiple user terminal packets from one or more user terminals and a network encoded data packet from a relay station, wherein said network encoded data packet is obtained after said relay station performs network encoding on the copies of multiple user terminal packets respectively received from said one or more user terminal; performing joint soft combining and decoding on said copies of multiple user terminal packets and said network encoded data packet.

According to another embodiment of the present invention, a method of forwarding data packets from multiple user terminals in a relay station of a wireless communication network is provided. The method comprises the following steps of: receiving copies of multiple data packets from one or more user terminals, respectively; performing network encoding processing on said copies of multiple data packets, so as to obtain a network encoded data packet; sending said network encoded data packet to a base station.

According to yet another embodiment of the present invention, a decoding apparatus for decoding data packets from user terminals in a base station of a wireless communication network is provided. The decoding apparatus comprises: a first receiving unit for receiving copies of multiple user terminal packets from one or more user terminals and a network encoded data packet from a relay station, wherein said network encoded data packet is obtained after said relay station performs network encoding on said copies of multiple user terminal packets respectively received from said one or more user terminals; a soft combining and decoding unit for performing joint soft combining and decoding on said copies of multiple user terminal packets and said network encoded data packet.

According to a further embodiment of the present invention, a forwarding apparatus for forwarding data packets from multiple user terminals in a relay station of a wireless communication network is provided. The forwarding apparatus comprises: a second receiving unit for receiving copies of multiple data packets from one or more user terminals, respectively; a network encoding unit for performing network encoding processing on said copies of multiple data packets, so as to obtain a network encoded data packet; a sending unit for sending said network encoded data packet to a base station.

By using the methods and apparatus of the present invention, radio frequency resources of uplink communication links are efficiently saved, and power consumption in relay station is efficiently reduced.

BRIEF DESCRIPTION OF DRAWINGS

Other features, objectives and advantages of the present invention will become more apparent from the following detailed description of the non-limiting embodiments in conjunction with the accompanying drawings.

Where, same or similar reference signs refer to same or similar step features or apparatus (modules).

DETAILED DESCRIPTION OF EMBODIMENTS

Detailed description of the embodiments of the present invention is given below in conjunction with the accompanying drawings.

Figure 2:
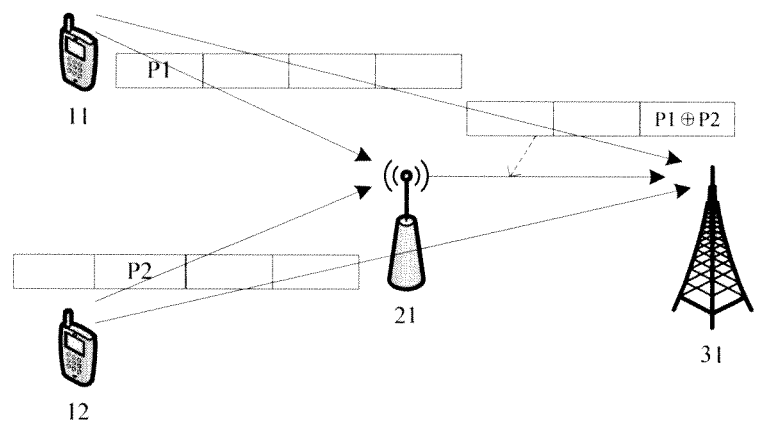
FIG. 2 is a diagram of forwarding data packets by a relay station of a wireless communication network according to a detailed embodiment of the present invention.

FIG. 2 is a diagram of a forwarding scheme of relay station 21 according to a detailed embodiment of the present invention. It is to be explained that only two user terminals 11 and 12 are illustrated in FIG. 2, but those skilled in the art should understand that the technical scheme of the present invention is applicable to the scenario of multiple user terminals, which will be also explained in the below.

Figure 3:
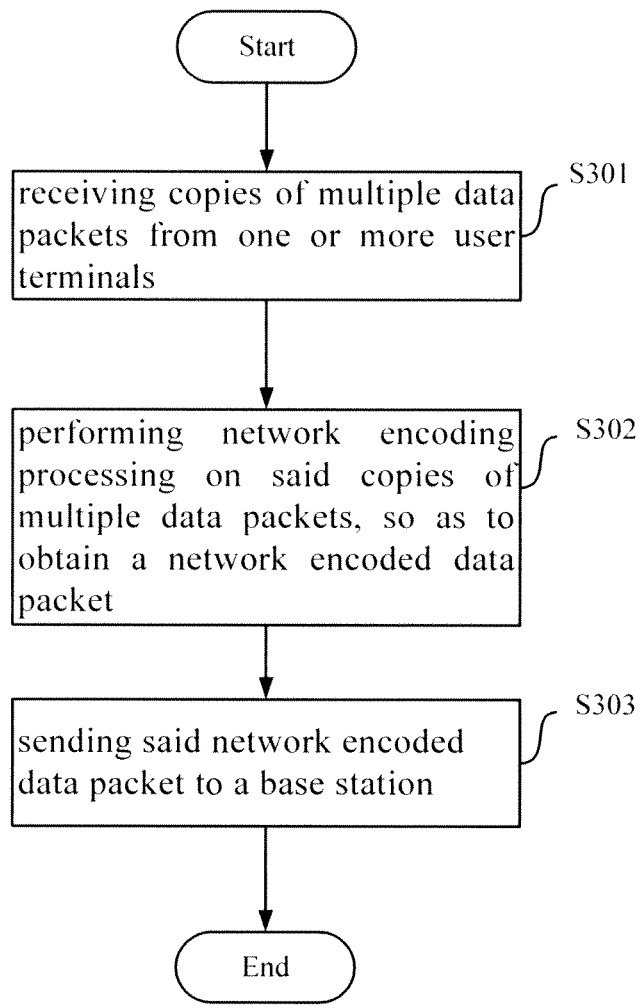
FIG. 3 is a flow diagram of a method of forwarding data packets from multiple user terminals in a relay station of a wireless communication network according to a detailed embodiment of the present invention.

FIG. 3 illustrates a flow diagram of a method, for forwarding data packets from multiple user terminals by relay 21 in FIG. 2. Detailed description of the steps illustrated in FIG. 3 is given below in conjunction with FIG. 2.

First, in step S301, relay 21 receives copies of data packets $P_1$ and $P_2$ from user terminals 11 and 12. It is to be explained that the order of sending data packet $P_1$ by user terminal 11 and sending data packet $P_2$ by user terminal 12 is not limited, and relay station 21 receives copies of data packets $P_1$ and $P_2$ as well as base station 31 receives copies of data packets $P_1$ and $P_2$.

Next, in step S302, relay station 21 performs network encoding on copies of data packets $P_1$ and $P_2$ respectively from user terminal 11 and 12, so as to obtain a network encoded data packet $P_{NC}$. The meaning of network encoding refers to saving transmission resources by means of encoding data of multiple sources, after demodulation and channel decoding processing are performed on data packets of multiple sources. For example, in the binary domain, network encoding comprises at least two following types: one is to perform bitwise XOR or XNOR processing on the multiple bit sequences obtained after performing channel decoding on the multiple user terminal data packets, and if the length of each bit sequence is not identical, the shorter bit sequences are padded with zeros or ones or other predefined information to achieve the length of the longest bit sequence; the other is to perform multiplication transforming in the binary domain on at least one of multiple bit sequences obtained after performing channel decoding on the multiple user terminal data packets, and then to perform adding transforming processing in the binary domain with other bit sequences. Examples for the above two network encoding manners are respectively described in the below.

Without loss of generality, it is assumed that the hit sequence obtained after relay station 21 performs channel decoding on data packet $P_1$ is 0101100110, which is ten bits in total, and the bit sequence is the correct bit sequence; the bit sequence obtained after relay station 21 performs channel decoding on data packet $P_2$ is 1100001100, which is ten bits in total.

By performing bitwise XOR processing on the above two bit sequences, the bit sequence of data packet $P_{NC}$ obtained is 1001101010; if XNOR processing is performed, the bit sequence of data packet $P_{NC}$ obtained is 0110010101.

By performing an operation of multiplying with 3 in the binary domain on the bit sequence of data packet $P_1$, 10000110010, which is 11 bits in total, is obtained. By performing a binary adding processing on it and the bit sequence of data packet $P_2$, the bit sequence of data packet $P_{NC}$ obtained is 11100111110.

Finally, in step S303, relay station 21 sends the network encoded data packet to base station 31. Specifically, relay station 21 sends it via a transmitter after performing channel encoding and symbol modulation on the network encoded data packet.

It is to be explained that, the network encoding processing is not limited to be performed in the binary domain and can be performed in the octal domain, hex domain or decimal domain, for example.

Figure 4:
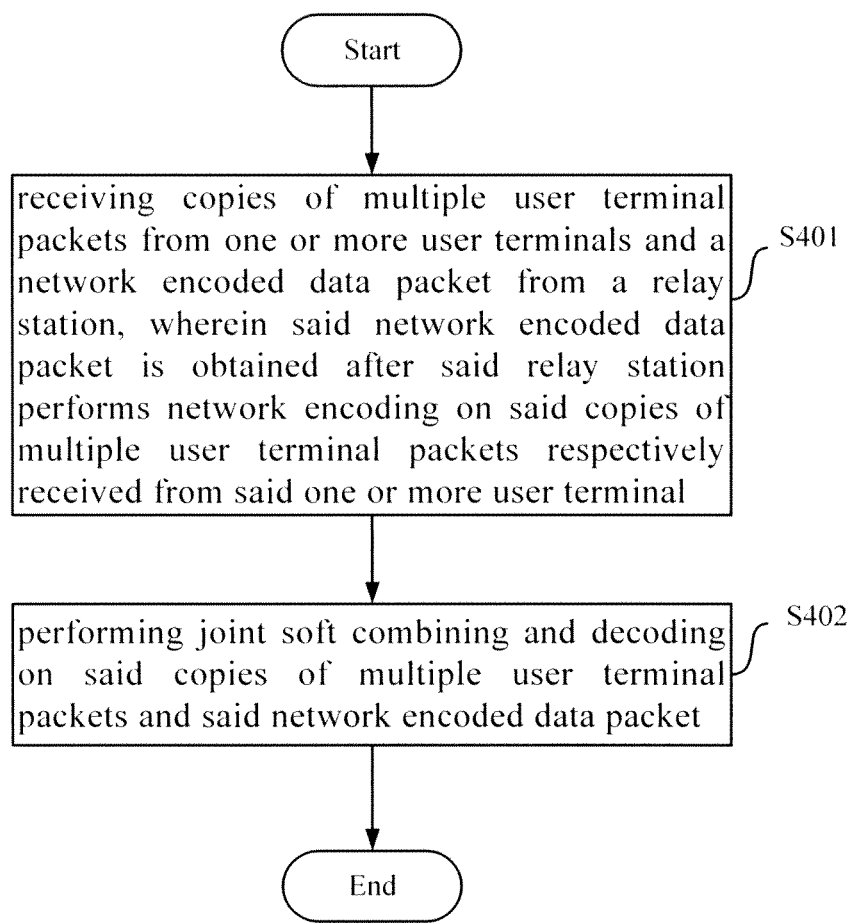
FIG. 4 is a flow diagram of a method of decoding data packets from user terminals in a base station of a wireless communication network according to a detailed embodiment of the present invention.

FIG. 4 shows a flow diagram of a method for decoding a data packet from user terminals in a base station according to an embodiment of the present invention. Following in conjunction with FIG. 2, the decoding procedure to data packets from user terminal 11 or 12 by base station 31 locating in FIG. 2 is described in detail.

First, in step S401, base station 31 receives a network encoded data packet from relay station 21, and copies of data packets $P_1$ and $P_2$ respectively from user terminal 11 and 12, wherein, the network encoded data packet from relay station 21 is obtained after relay station 21 performs said network encoding mentioned above on the copies of the two user terminal data packets $P_1$ and $P_2$ received from the user terminal 11 and 12, respectively.

Generally, because of processing delay in relay station 21, base station 31 firstly receives copies of data packets $P_1$ and $P_2$ respectively from user terminal 11 and 12. It is to be explained that, due to the difference between the wireless communication links from user terminal 11 or 12 to relay station 21 and from user terminal 11 or 12 to base station 31, copies of a same data packet $P_1$ or $P_2$ received by relay station 21 and base station 31 may be different. For example, because relay station 21 is closer to user terminal 11 or 12, the copy of data packet $P_1$ or $P_2$ it received can be completely correctly received; Since base station 31 is farther from user terminal 11 or 12, the copy of data packet $P_1$ or $P_2$ it received may be mistakenly received.

It is to be explained that, the skilled in the field should understand, specifically, the means of sending data packets $P_1$ and $P_2$ can be time division, code division, frequency division, space division etc. Because the means of sending the data packets has no direct relationship with the present invention, it will not be described in detail here.

Thereafter, in step S402, joint soft combining and decoding processing are performed on copies of user terminal data packets $P_1$ and $P_2$, and on said network encoding data packet $P_{NC}$.

Figure 5:
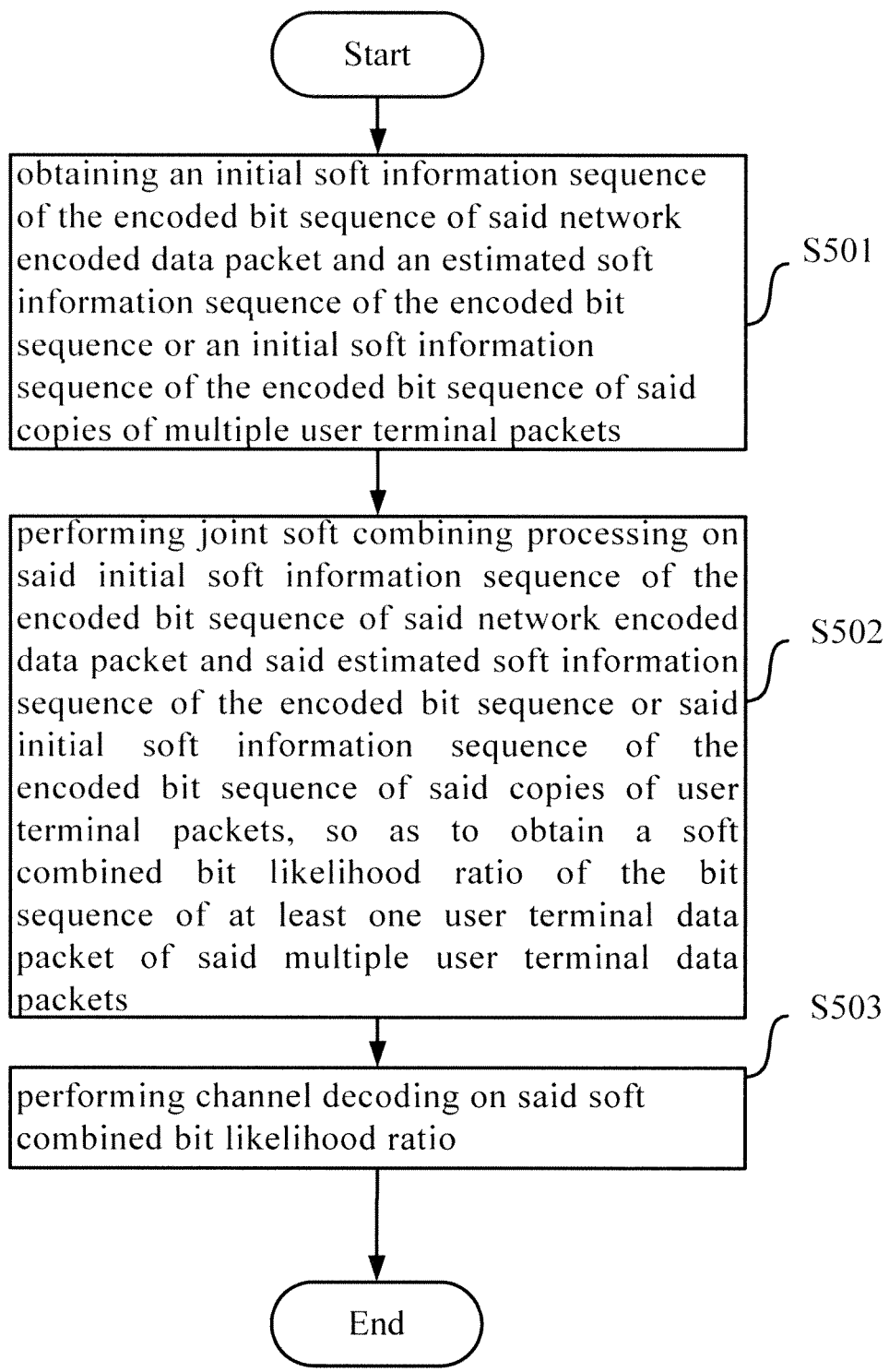
FIG. 5 is a flow diagram of a sub-step of step S402 illustrated in FIG. 4.

FIG. 5 shows a flow diagram of a sub-step of step S402 according to an embodiment of the present invention.

First, in step S501, base station 31 obtains an initial soft information sequence of an encoded bit sequence of network encoded data packet $P_{NC}$ and an estimated soft information sequence of an encoded bit sequence or an initial soft information sequence of an encoded bit sequence of said copies of multiple user terminal packets.

The following describes in detail the computation procedure to initial soft information of an encoded bit sequence.

Without loss of generality, for example, an initial bit likelihood ratio is taken as initial soft information. Assuming symbol in data packet $P_1$ sent by user terminal 11 is $s_1$, and then the symbol received by base station 31 is $y_{U1,B}$:

$$y_{U1,B} = h_{U1,B} \cdot s_1 + n_{U1,B} \quad (1)$$

Where, $h_{U1,B}$ is the channel transfer coefficient from user terminal 11 to base station 31, $n_{U1,B}$ is a Gaussian distributed noise with variance $\sigma^2$, then the likelihood ratio of symbol $s_1$ is:

$$LLR(S_1) = \log P(y_{U1,B} | s_{1i}) = -\frac{(y_{U1,B} - h_{U1,R} s_{1i})^2}{2\sigma^2} \quad (2)$$

Where, $s_{1i}$ are all possible values of symbol $s_1$. For example for QPSK symbol, i=1~4.

The initial bit likelihood ratio of bit j of symbol $s_1$ can be obtained from the following equation:

$$LLR(b_j) = \log \frac{P(b_j = 1 \mid y_{U1,B})}{P(b_j = 0 \mid y_{U1,B})} \quad (3)$$

$$= \log \left[ \frac{\sum\limits_{s_i; b_j=1} P(y_{U1,B} \mid s_i)}{\sum\limits_{s_k; b_j=1} P(y_{U1,B} \mid s_k)} \right]$$

$$= \log \left[ \frac{\sum\limits_{s_i; b_j=1} \exp(LLR(s_i))}{\sum\limits_{s_k; b_j=1} \exp(LLR(s_k))} \right]$$

Where, j, k is the bits contained by each symbol. For example for QPSK symbol, j, k=1~2.

By performing channel decoding after initial soft information sequence of an encoded bit sequence is input into a channel decoder, the channel decoder outputs the estimated soft information sequence of the encoded bit sequence.

By performing processing of equations (2) and (3) on the network encoded data packets, an initial soft information sequence of the encoded bit sequence of the network encoded data packets is obtained.

In step S502, base station 31 performs joint soft combining processing on an initial soft information sequence of an encoded bit sequence of network encoded data packet $P_{NC}$ and an estimated soft information sequence of an encoded bit sequence or an initial soft information sequence of an encoded bit sequence of copies of user terminal packets $P_1$ and $P_2$, so as to obtain a soft combined bit likelihood ratio of the bit sequence of at least one user terminal data packet out of said multiple user terminal data packets.

Optionally, in an embodiment of the present invention, the network encoding performed in base station 21 is bitwise XOR processing on the two bit sequences after performing channel decoding on copies $P_1$ and $P_2$ of user terminal data packets. Joint soft combining can be performed in base station 31 according to the following equation:

$$L\tilde{L}R(b_1) = L\hat{L}R(b_1) + \log \frac{\exp(LLR(b_{NC})) + \exp(L\hat{L}R(b_2))}{1 + \exp(LLR(b_{NC}) + L\hat{L}R(b_2))} \quad (4)$$

Where, $b_1$ is an encoded bit in user terminal data packet $P_1$, $L\tilde{L}R(b_1)$ is the joint soft combining likelihood ratio after performing soft combining on the encoded bit, $L\hat{L}R(b_1)$ is an estimated bit likelihood ratio or initial bit likelihood ratio of the encoded bit, $L\hat{L}R(b_2)$ is an estimated likelihood ratio of corresponding encoded bit $b_2$ in the user terminal data packet, on which XOR processing is performed with encoded bit $b_1$, $LLR(b_{NC})$ is an initial bit likelihood ratio of the corresponding encoded bit $b_{NC}$ in network encoded data packet $P_{NC}$.

By taking the approximation theorem $\log(e^a + e^b) \approx \max(a, b)$, the above equation can be simplified to equation (5), so that computation effort of base station 31 can be greatly reduced.

$$L\tilde{L}R(b_1) = L\hat{L}R(b_1) + \log \frac{\exp(LLR(b_{NC})) + \exp(L\hat{L}R(b_2))}{1 + \exp(LLR(b_{NC}) + L\hat{L}R(b_2))} \quad (5)$$

-continued
$$\approx L\hat{L}R(b_1) + \max(LLR(b_{NC}), L\hat{L}R(b_2)) -$$
$$\max(0, LLR(b_{NC}) + L\hat{L}R(b_2))$$

Then, in step S503, base station 31 performs channel decoding on the soft combining bit likelihood ratio obtained according to equation (4) or (5), so as to obtain a bit sequence of data packet $P_1$ or $P_2$.

The following describes in detail the derivation process of equation (4).

Suppose $s_3$ is symbol of data packet $P_{NC}$ sent by relay station 21. The symbol that base station 31 received is $y_{R,B}$:

$$y_{R,B} = h_{R,B} \cdot s_3 + n_{R,B} \quad (6)$$

For example, for bit $b_{NC}$ in data packet $P_{NC}$ that is obtained after performing XOR processing on bit $b_1$ in data packet $P_1$ and bit $b_2$ in data packet $P_2$, according to Maximum A Posteriori (MAP) principle, the bit likelihood of bit $b_1$ can be expressed by the following equation:

$$L\tilde{L}R(b_1) = \log \frac{P[b_1 = 1 \mid y_{NC}]}{P[b_1 = 0 \mid y_{NC}]} \quad (7)$$

$$= \log \frac{P[b_1 = 1, y_{NC}] / P[y_{NC}]}{P[b_1 = 0, y_{NC}] / P[y_{NC}]}$$

Where, $y_{NC}$ is the value of the symbol, which is interfered and attenuated by channel and received by base station 31, when $s_3$ is the symbol sent by relay station 21. Wherein, character $s_3$ is the symbol after performing modulation on a bit sequence comprising bit $b_{NC}$. For example for QPSK, $b_{NC,1}$ and $b_{NC,2}$ two bits are modulated to one symbol $s_3$.

TABLE 1

| Possible values of bit transmitted | | |
| --- | --- | --- |
| $b_1$ | $b_2$ | $b_{NC}$ |
| 0 | 0 | 0 |
| 0 | 1 | 1 |
| 1 | 0 | 1 |
| 1 | 1 | 0 |

Because $b_{NC}$ is obtained by performing XOR on bit $b_1$ in data packet $P_1$ and bit $b_2$ in data packet $P_2$, the joint probability on the right side of equation (7) is related to the probabilities of $b_1$ and $b_2$. Table 1 shows all possible values of $b_1$, $b_2$ and $b_{NC}$. The numerator in the right term of equation (7) shows the probabilities of the two lower lines in table 1, and the denominator expresses the probabilities of the two upper lines in table 1.

According to table 1, equation (8) can be obtained according to equation (7):

$$L\tilde{L}R(b_1) = \log \frac{\begin{array}{l} P[y_{NC} \mid b_{NC} = 1]P(b_1 = 1)P(b_2 = 0) + \\ P[y_{NC} \mid b_{NC} = 0]P(b_1 = 1)P(b_2 = 1) \end{array}}{\begin{array}{l} P[y_{NC} \mid b_{NC} = 0]P(b_1 = 0)P(b_2 = 0) + \\ P[y_{NC} \mid b_{NC} = 1]P(b_1 = 0)P(b_2 = 1) \end{array}} \quad (8)$$

Dividing both the numerator and denominator of equation (8) by $P[y_{NC}|b_{NC}=0]P(b_1=0)P(b_2=0)$ obtains:

$$L\hat{L}R(b_1) = \log\frac{\exp(LLR(b_{NC}) + L_a(b_1)) + \exp(L_a(b_1) + L_a(b_2))}{1 + \exp(LLR(b_{NC}) + L_a(b_2))} \quad (9)$$

$$= L_a(b_1) + \log\frac{\exp(LLR(b_{NC})) + \exp(L_a(b_2))}{1 + \exp(LLR(b_{NC}) + L_a(b_2))}$$

Where, $LLR(b_{NC})$ is an initial bit likelihood ratio of bit $b_{NC}$ determined according to equation (3), $$L_a(b_n) = \log\frac{P(b_n = 1)}{P(b_n = 0)},$$

n=1,2 is the bit likelihood ratio of bit $b_n$. If bit $b_n$ is not received, then let $P(b_n=1)=P(b_n=0)$, $L_d(b_n)=0$. Since $b_1$ and $b_2$ have already been received, therefore, the initial bit likelihood ratios of bit $b_1$, $b_2$ or the estimated bit likelihood ratio output by channel decoder can be used to substitute $L_d(b_n)$, and the latter is preferred. Thus equation (4) or equation (5) can be obtained.

TABLE 2

| \multicolumn{4}{c}{possible values of bit transmitted} | | | |
|---|---|---|---|
| $b_1$ | $b_2$ | $b_3$ | $b_{NC}$ |
| 0 | 0 | 0 | 0 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 1 |

Optionally, prior to step S502 as shown in FIG. 5, base station 31 performs channel decoding on an initial bit likelihood ratio sequence of an encoded bit sequence of data packets $P_1$ and $P_2$. If channel decoding is performed correctly on both of the data packets, for example CRC verification results are correct, the data bit sequences of $P_1$ and $P_2$ after channel decoding are stored, and said soft combining processing as described in step S502 does not need to be performed. If any data packet, for example the channel decoding of data packet $P_1$, is not correct, said soft combining processing as mentioned in step S502 needs to be performed on data packet $P_1$. At this time, base station 31 stores the estimated soft information sequence or the initial soft information sequence of the encoding bit sequence of $P_1$ and $P_2$, getting ready for the soft combining processing as shown in step S502 on the initial soft information sequence of the encoded bit sequence of the network encoded data packet that is received later.

Figure 6:
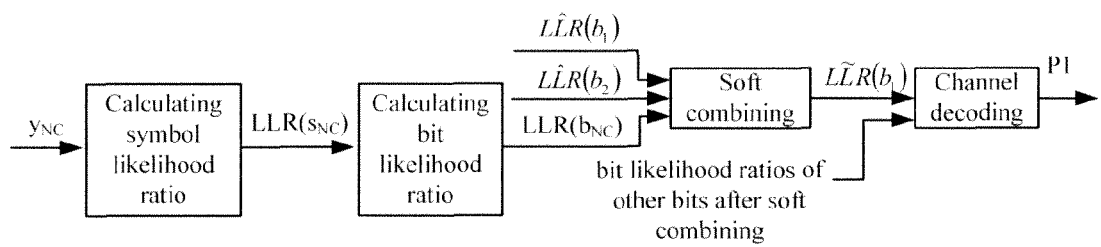
FIG. 6 is a block diagram of decoding in a base station of a wireless communication network according to a detailed embodiment of the present invention.

FIG. 6 shows a diagram of decoding in base station 31 at that time.

Figure 1:
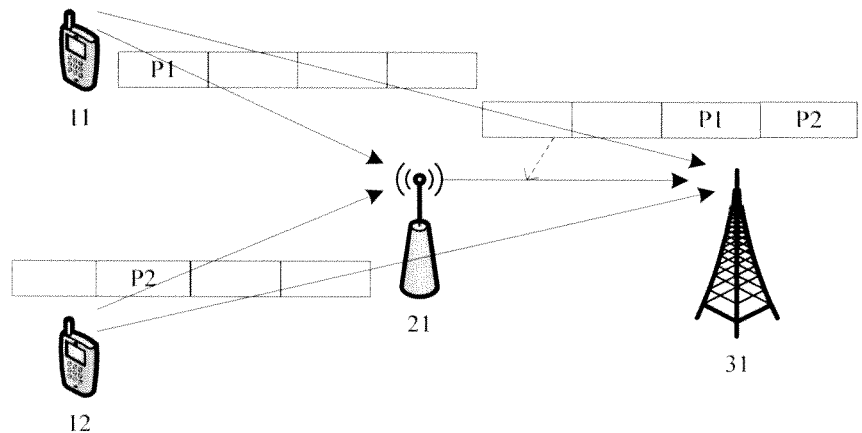
FIG. 1 is a diagram of the network topology structure in prior art.

The above describes in detail the derivation procedure of equation (4) for the application scenario shown in FIG. 1. According to the above derivation procedure, the skilled in the field can expand the present invention to normal application scenarios. For example, for the application scenario shown in FIG. 7, where network encoded $P_{NC}$ is formed by performing bitwise XOR on copies of three data packets from user terminals 11, 12 and 13, according to table 2, the following equation is not difficult to obtain:

$$L\hat{L}R(b_1) = L\hat{L}R(b_1) + \qquad (10)$$

$$\log\frac{e^{LLR(b_{NC})} + e^{L\hat{L}R(b_2)} + e^{L\hat{L}R(b_3)} + e^{LLR(b_{NC})+L\hat{L}R(b_2)+L\hat{L}R(b_3)}}{1 + e^{LLR(b_{NC})+L\hat{L}R(b_2)} + e^{LLR(b_{NC})+L\hat{L}R(b_3)} + e^{L\hat{L}R(b_2)+L\hat{L}R(b_3)}}$$

Accordingly, it is not difficult to derive a normal equation (ii) where number of user terminals is m:

$$L\hat{L}R(b_1) = L\hat{L}R(b_1) + \log\frac{\sum_{oddc} e^{LLR(oddc)}}{\sum_{evenc} e^{LLR(evenc)}} \quad (11)$$

Here, LLR(oddc) is a combination of an odd number of bit likelihood ratios out of estimated likelihood ratio $L\hat{L}R(b_2)$, $L\hat{L}R(b_3)$, $L\hat{L}R(b_m)$ of corresponding encoded bit $b_2, b_3, \ldots b_m$ of other user terminal data packets, with which XOR processing is performed on encoded bit $b_1$, and a bit likelihood ratio $LLR(b_{NC})$ of the initial bit likelihood sequence of corresponding encoded bit $b_{NC}$ in the network encoded data packet, $$\sum_{oddc} e^{LLR(oddc)}$$

is the sum of all e raised to the power of the combinations of odd numbers of bit likelihood ratios, $b_{NC}=b_1\oplus b_2\oplus \ldots \oplus b_m$, m is the total number of user terminals; LLR(evenc) is a combination of an even number of bit likelihood ratios out of estimated likelihood ratios $L\hat{L}R(b_2)$, $L\hat{L}R(b_3)$, $L\hat{L}R(b_m)$ of corresponding encoded bits $b_2, b_3, \ldots b_m$ of the other user terminal data packets, with which XOR processing is performed on said encoded bit $b_1$, and a bit likelihood ratio of the initial bit likelihood ratio of corresponding encoded bit $b_{NC}$ of the network encoded data packet, $$\sum_{evenc} e^{LLR(evenc)}$$

is the total sum of all e raised to the power of the combinations of bit likelihood ratios.

It is to be explained that, equation (4), (5), (10) and (11) are soft combining processing equations obtained aiming to bitwise XOR processing. XNOR is the similar operation to XOR. On the basis of equations (4), (5), (10) and (11) the skilled in the field can easily obtain the soft combining processing equation corresponding to equation (4), (5), (10) and (11) in a scenario where bitwise XNOR processing is performed, and it will not be described here in detail here.

In another embodiment of the present invention, a weight coefficient can be added to each bit likelihood ratio in equations (4), (5), (10) and (11). For example, the bit likelihood ratio coefficient can be determined by whether the channel quality of the channels for transmitting each data packet is good or bad. For example, if the channel quality of the channel for transmitting data packet $P_1$ is worse than the channel quality of the channel for transmitting data packet $P_{NC}$, then the weight coefficient before $L\hat{L}R(b_1)$ is smaller than the weight coefficient before $L\hat{L}R(b_{NC})$.

It is to be explained additionally that, the above describes in detail the network encoding procedure in relay station 21 and decoding procedure in base station 31 for data packets $P_1$ and $P_2$ respectively from user terminals 11 and 12. If data packets $P_1$ and $P_2$ both come from user terminal 11 or 12, the network encoding procedure in relay station 21 and the decoding procedure in base station 31 are same as above text.

It is to be further explained that, according to different network encoding specifically adopted, the style of joint soft combining and decoding that are performed in base station 21 is also various, not limited to the above descriptions in said embodiments.

Figure 8:
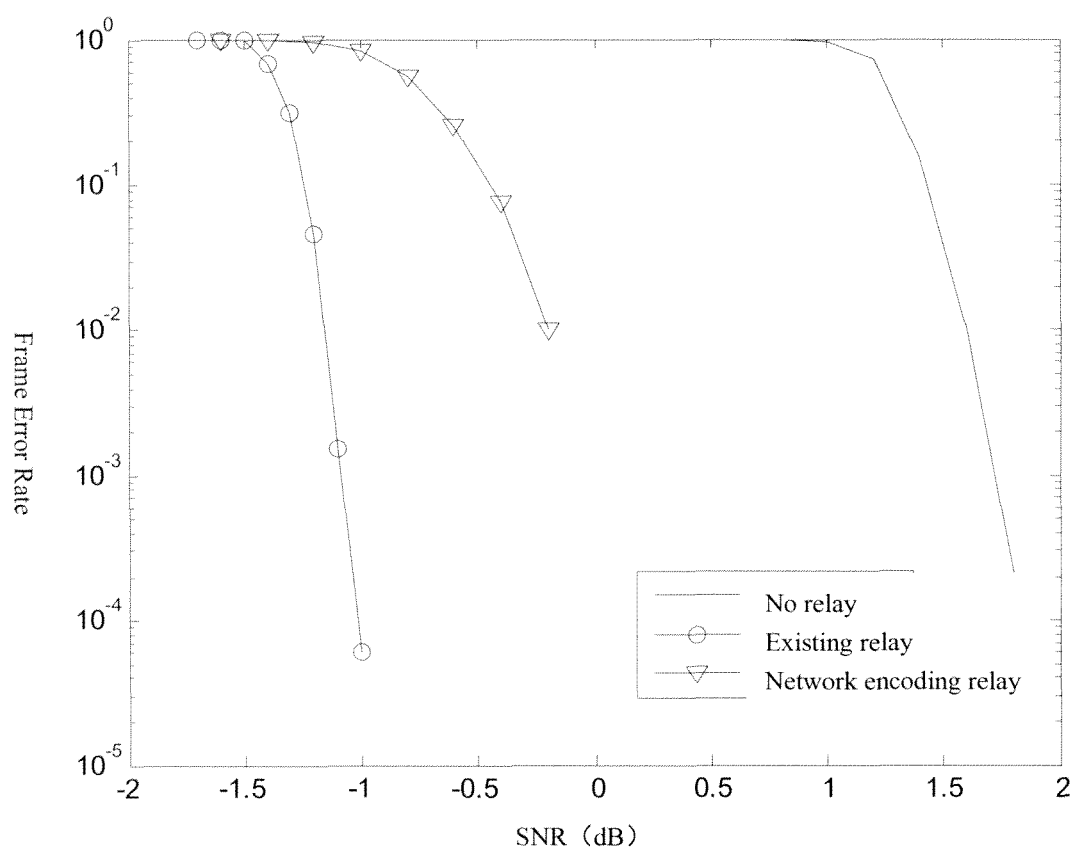
FIG. 8 is a diagram of simulation results of frame error rate according to a detailed embodiment of the present invention.

The soft combining algorithmic in equation (4) or (5) is further verified by the experiment on the application scenario shown in FIG. 2. FIG. 8 shows the results of the experiment. The additive Gaussian white noise Rayleigh wireless communication channel simulation model with unit variance is adopted in the experiment in FIG. 8. For the purpose of convenience, suppose the channel transmission coefficients of user terminals 11 and 12 to relay station 21 or base station 31 are equal, and the signal noise ratio of user terminal 11 or 12 to the communication link of base station 31 is 6 dB worse than the signal noise ratio of the communication link of relay station 21 to base station 31. 3460 bits UMTS ⅓ Turbo codes and QPSK symbol modulation are adopted in channel encoding. Frame Error Rates (FER) in base station 31 with the present relay as shown in FIG. 1, with a relay adopting the combining algorithmic as shown in equation (4) or (5), and without a relay, are respectively shown in FIG. 8. It can be obviously seen from FIG. 8 that, for the application scenario shown in FIG. 2, the frame error rate in base station 31 is evidently lower than the frame error rate without a relay, but slightly higher than the frame error rate of the present relay as shown in FIG. 1. However, in comparison to the latter, in the application scenario shown in FIG. 2, approximately 50% relay resources are saved, and the power dissipation in relay station 21 is correspondingly reduced.

Figure 7:
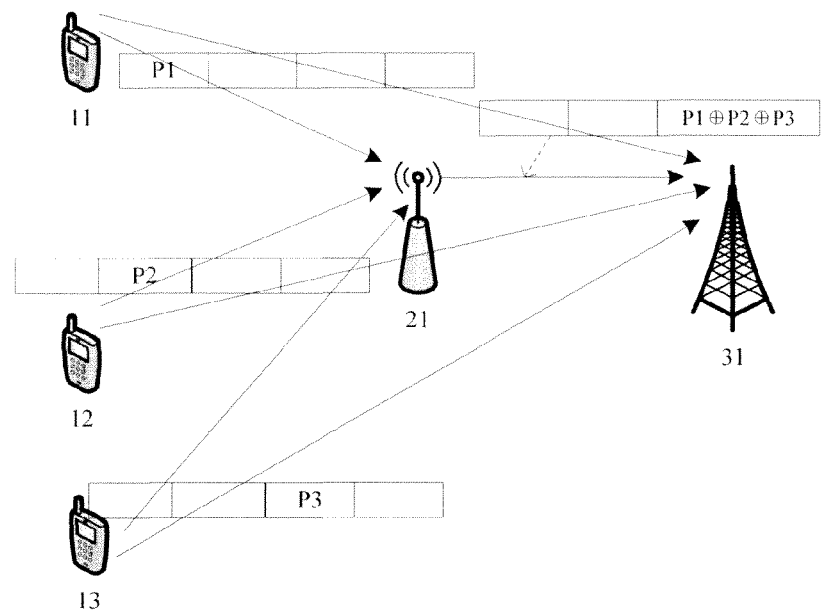
FIG. 7 is a diagram of forwarding data packets by a relay station according to another detailed embodiment of the present invention.
Figure 9:
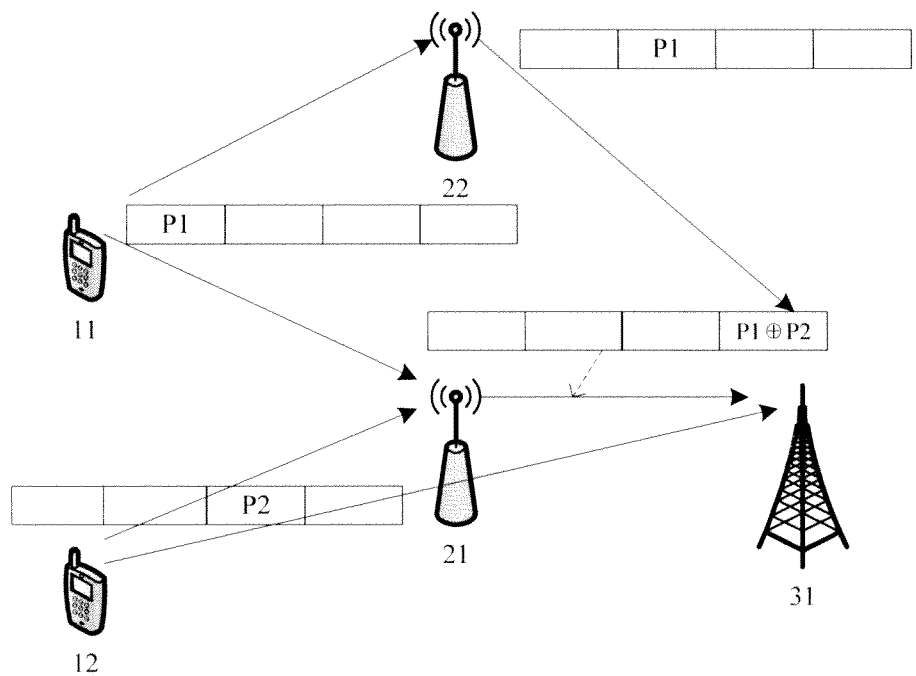
FIG. 9 is a diagram of an application scenario according to another detailed embodiment of the present invention.

It is to be explained that, the present invention is not limited to the application scenarios shown in FIG. 2 or FIG. 7. For example, data packets $P_1$ or $P_2$, which is received by base station 31, is not limited to be sent directly by each user terminal, or probably by a certain relay station, such as being relayed by relay station 22 as shown in FIG. 9.

Figure 10:
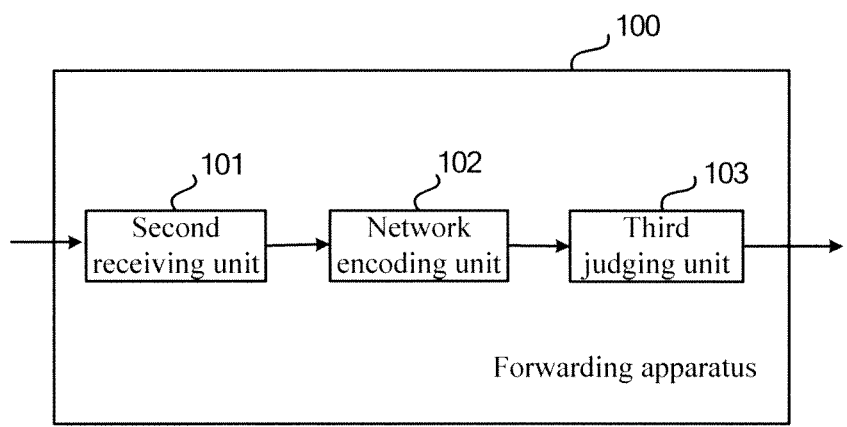
FIG. 10 is a structural diagram of forwarding apparatus 100 for forwarding data packets in a relay station of a wireless communication network according to a detailed embodiment of the present invention.

FIG. 10 shows a structure diagram of forwarding unit 100 used to forward data packets from multiple user terminals in a relay station of a wireless communication network according to an embodiment of the present invention. In FIG. 10, forwarding unit 100 comprises a second receiving unit 101, network encoding unit 102 and sending unit 103.

In the following by taking the application scenario shown in FIG. 2 as an example, the forwarding procedures by relay station 21 in FIG. 2 to data packets $P_1$ and $P_2$ respectively coming from user terminal 11 and 12 are explained in detail.

Firstly, second receiving unit 101 receives copies of the two data packets respectively coming from user terminal 11 and 12. It is to be explained that, the order of sending data packet $P_1$ by user terminal 11 and sending data packet $P_2$ by user terminal 12 is not limited, and second receiving unit 101 receives copies of data packets $P_1$ and $P_2$ as well as base station 31 receives copies of data packets $P_1$ and $P_2$.

Then, network encoding unit 102 performs network encoding processing on the copies of data packets $P_1$ and $P_2$ coming from user terminals 11 and 12, so as to obtain a network encoded data packet $P_{NC}$. The meaning of network encoding refers to saving transmission resources by means of performing encoding on multiple data packets after performing demodulation, channel decoding processing on the data packets of multiple sources. For example, in the binary domain, network encoding includes at least the following two types:

one is to perform bitwise XOR or XNOR processing on the multiple bit sequences after performing channel decoding on the multiple user terminal data packets, if the length of each bit sequence is not identical, the end of shorter bit sequences are padded with zero or 1 to achieve the length of the longest bit sequence; another is to perform adding transforming processing with the other bit sequences after performing multiplication transforming in the binary domain on at least one of multiple bit sequences obtained after performing channel decoding on the data packets of the multiple user terminals. The following text describes the two network encodings respectively by examples.

Without loss of generality, suppose the bit sequence obtained after relay station 21 performing channel decoding on data packet P1 is 0101100110, which is 10 bits in total, and the bit sequence is the correct bit sequence; the bit sequence obtained after relay station 21 performing channel decoding on data packet P2 is 1100001100, which is 10 bits in total.

By performing bitwise XOR processing on the above two bit sequences, the bit sequence 1001101010 of data packet $P_{NC}$ is obtained; if XNOR processing is performed, the bit sequence 0110010101 of data packet $P_{NC}$ is obtained.

By performing multiplication processing on the bit sequence of data packet $P_1$ by 3 in the binary domain, 10000110010 is obtained, which is 11 bits in total, and adding processing in the binary domain is performed on it with the bit sequence of data packet $P_2$ to get a bit sequence of data packet $P_{NC}$, which is 11100111110.

Finally sending unit 103 sends data packet $P_{NC}$ after network encoding processing to base station 30. Specifically, sending unit 103 sends the network encoded data packet $P_{NC}$ via a transmitter after performing channel encoding and symbol modulation processing on the data packet.

Figure 11:
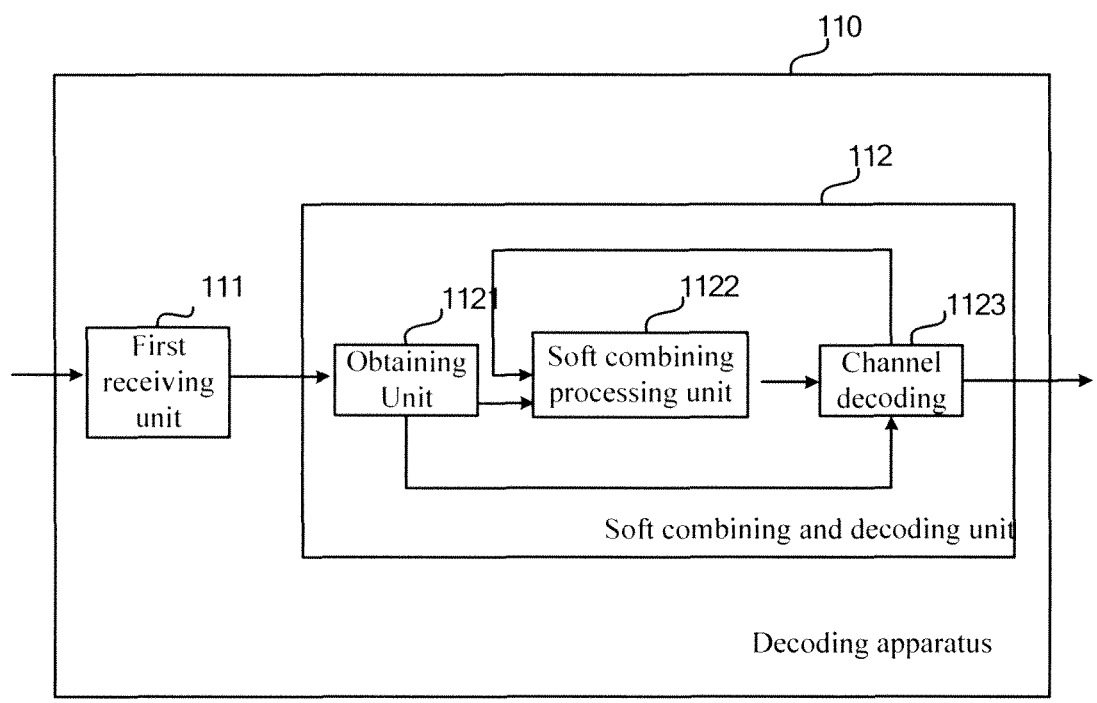
FIG. 11 is a structural diagram of decoding apparatus 110 for decoding data packets from user terminals in a base station of a wireless communication network according to a detailed embodiment of the present invention.

FIG. 11 shows a structure diagram of decoding unit 110 used to decode data packet from user terminal in a base station of a wireless communication network according to an embodiment of the present invention. In FIG. 11, decoding unit 110 comprises a first receiving unit 111 and soft combing decoding unit 112. In an example of the embodiment, soft combining decoding unit 112 comprises obtaining unit 1121, soft combining processing unit 1122 and channel decoding unit 1123, which are also shown together in FIG. 11. It is understood by the people in the field that, in FIG. 11, only first receiving unit 111 and soft combining decoding unit 112 are necessary units, the other units are optional.

The following takes the application scenario shown in FIG. 2 as an example, to describe in detail the procedure that base station 31 in FIG. 2 performs decoding on the data packets coming from user terminal 11 or 12.

First, first receiving unit 111 receives network encoded data packets from relay station 21, and copies of data packets $P_1$ and $P_2$ respectively coming from user terminals 11 and 12. Wherein, network encoded data packet $P_{NC}$ from relay station 21 is obtained by performing said network encoding mentioned above on the copies of the two user terminal data packets $P_1$ and $P_2$ respectively received by relay station 21 from the user terminal 11 and 12.

Generally, due to the processing delay in relay station 21, first receiving unit 111 first receives copies of data packets $P_1$ and $P_2$ respectively coming from user terminals 11 and 12. It should be explained that, because of the difference of the wireless communication links from user terminal 11 or 12 to relay station 21 and from user terminal 11 or 12 to base station 31, the copies of the same data packet $P_1$ or $P_2$ received by relay station 21 and base station 31 may be different. For example, because relay station 21 is closer to user terminal 11 or 12, the copy of data packet $P_1$ or $P_2$ it received may be completely correct; since base station 31 is farther from user terminal 11 or 12, the copy of data packet $P_1$ or $P_2$ that first receiving unit 111 received may be mistakenly received.

Then, soft combining unit 112 performs joint soft combining and decoding on the copies of user terminal data packets $P_1$, $P_2$, and said network encoded data packet $P_{NC}$.

According to an embodiment of the present invention, soft combining decoding unit 112 comprises three sub-units: obtaining unit 1121, soft combining processing unit 1122 and channel decoding unit 1123. The following describes in detail joint soft combining and decoding procedure of the three sub-units.

First, obtaining unit 1121 obtains the initial soft information sequence of the encoded bit sequence of network encoded data packet $P_{NC}$, and the initial soft information sequence of encoded bit sequence or estimated soft information sequence of the encoded bit sequence of copies of multiple user terminal data packets. The obtaining procedure of initial soft information or estimated soft information of encoded bit is described in detail in above text, and will not be mentioned again here.

Next, soft combining processing unit 1122 performs soft combining processing on the initial soft information of the encoded bit sequence of network encoded data packet $P_{NC}$, and on the initial soft information of the encoded bit sequence or the estimated soft information of the encoded bit sequence of copies of multiple user terminal data packets $P_1$ and $P_2$, so as to obtain a soft combining likelihood ratio sequence of the bit sequence of at least one user terminal data packet in said multiple user terminal data packets.

Optionally, in an embodiment, if the network encoding executed in relay station 21 is bitwise XOR processing on two bit sequences after performing channel decoding on copies of user terminal data packets $P_1$ and $P_2$, soft combining processing unit 1122 can perform soft combining processing according to equation (4) or equation (5).

Finally, channel decoding unit 1123 performs channel decoding on the soft combining likelihood ratio sequence obtained by soft combining processing unit 1122 according to equation (4) and (5), so as to obtain a bit sequence of data packets $P_1$ or $P_2$.

Optionally, before soft combining processing unit 1122 and channel decoding unit 1123 performing above operations, channel decoding unit 1123 performs channel decoding on the initial bit likelihood ratio of each bit of data packets $P_1$ and $P_2$. If the channel decoding of the two data packets is correct, for example CRC verification results are correct, then soft combining processing unit 1122 does not need to perform said soft combining processing described above according to equation (4) (5). If the channel decoding of a data packet, such as data packet $P_1$, is incorrect, soft combining processing unit 1122 needs to perform soft combining processing on said data packet $P_1$.

Above describes in detail the embodiments of the present invention. It should be understood that, the present invention is not limited to the above specific embodiments, and any variation or modification can be made by those skilled in the art without departing from the scope of the appended claims. The technical schemes of the present invention can be realized by software or hardware.

The invention claimed is:

1. A method of decoding data packets from user terminals in a base station of a wireless communication network, comprising:

in the base station, receiving copies of multiple user terminal packets from one or more user terminals and a network encoded data packet from a relay station, wherein said network encoded data packet is obtained after said relay station performs network coding on said copies of multiple user terminal packets respectively received from said one or more user terminals; and in the base station, performing joint soft combining and decoding on said copies of multiple user terminal packets and said network encoded data packet.

2. A method of decoding data packets from user terminals in a base station of a wireless communication network, comprising:

receiving copies of multiple user terminal packets from one or more user terminals and a network encoded data packet from a relay station, wherein said network encoded data packet is obtained after said relay station performs network coding on said copies of multiple user terminal packets respectively received from said one or more user terminals; and performing joint soft combining and decoding on said copies of multiple user terminal packets and said network encoded data packet;

wherein said network encoding comprises performing, by said relay station, multiplication transforming in the binary domain on at least one of multiple bit sequences obtained after performing channel decoding on said copies of multiple user terminal data packets received by said relay station, and then performing adding transforming processing in the binary domain with other bit sequences; or performing bitwise XOR or XNOR processing on the multiple bit sequences.

3. A method according to claim 2, wherein said step of performing joint soft combining and decoding comprises the following steps:

B1. obtaining an initial soft information sequence of encoded bit sequence of said network encoded data packet and an estimated soft information sequence of an encoded bit sequence or an initial soft information sequence of the encoded bit sequence of said copies of multiple user terminal packets;

B2. performing joint soft combining processing on said initial soft information sequence of the encoded bit sequence of said network encoded data packet and said estimated soft information sequence of the encoded bit sequence or said initial soft information sequence of the encoded bit sequence of said copies of multiple user terminal packets, so as to obtain a soft combined bit likelihood ratio sequence of the bit sequence of at least one user terminal data packet of said multiple user terminal data packets;

B3. performing channel decoding on said soft combined bit likelihood ratio sequence.

4. A method according to claim 3, wherein said network encoding comprises performing bitwise XOR processing on multiple bit sequence obtained after performing channel decoding on said copies of multiple user terminal data packets, said step B2 comprises the following step:

performing soft combining processing according to equation $$L\tilde{L}R(b_1) = L\hat{L}R(b_1) + \log \frac{\sum_{oddc} e^{LLR(oddc)}}{\sum_{evenc} e^{LLR(evenc)}},$$

wherein $b_1$ is an encoded bit in a user terminal data packet, $L\tilde{L}R(b_1)$ is the soft combined bit likelihood ratio after performing soft combining on the encoded bit, $L\hat{L}R(b_1)$ is an estimated bit likelihood ratio of the encoded bit, LLR(oddc) is a combination of an odd number of bit likelihood ratios out of estimated likelihood ratios $\hat{LLR}(b_2)$, $\hat{LLR}(b_3)$, $\hat{LLR}(b_m)$ of corresponding encoded bits $b_2, b_3, \ldots b_m$ of other user terminal data packets with which XOR processing is performed on the encoded bit $b_1$ and an initial bit likelihood ratio of corresponding encoded bit $b_{NC}$ in said network encoded data packet, $$\sum_{oddc} e^{LLR(oddc)}$$

is the sum of all e raised to the power of the combinations of an odd number of bit likelihood ratios combinations, $b_{NC} = b_1 \oplus b_2 \oplus \ldots \oplus b_m$, m is the number of the user terminals; LLR(evenc) is a combination of an even number of bit likelihood ratios out of estimated likelihood ratios $\hat{LLR}(b_2)$, $\hat{LLR}(b_3)$, $\hat{LLR}(b_m)$ of corresponding encoded bits $b_2, b_3, \ldots b_m$ of the other user terminal data packets with which XOR processing is performed on the encoded bit $b_1$ and the initial bit likelihood ratio of the corresponding encoded bit $b_{NC}$ in said network encoded data packet, $$\sum_{evenc} e^{LLR(evenc)}$$

is the sum of all e raised to the power of the combinations of bit likelihood ratios.

5. A method according to claim 3, wherein said initial soft information of an encoded bit comprises an initial bit likelihood ratio of the encoded bit which is determined according to the following equation:

$$LLR(b_j) = \log \frac{P(b_j = 1 \mid y_{U1,B})}{P(b_j = 0 \mid y_{U1,B})}$$

$$= \log \left[ \frac{\sum_{s_i; b_j=1} P(y_{U1,B} \mid s_i)}{\sum_{s_k; b_j=1} P(y_{U1,B} \mid s_k)} \right]$$

$$= \log \left[ \frac{\sum_{s_i; b_j=1} \exp(LLR(s_i))}{\sum_{s_k; b_j=1} \exp(LLR(s_k))} \right]$$

wherein $LLR(b_j)$ is the initial bit likelihood ratio of the j-th bit in symbol s1, $y_{U1,B} = h_{U1,B} \cdot s_1 + n_{U1,B}$, $s_1$ is symbol sent by user terminal U1 or the relay station, $h_{U1,B}$ is channel transfer coefficient, $n_{U1,B}$ is noise; $s_i$ and $s_k$ are all possible values of symbol $s_1$.

6. A method according to claim 3, further comprising the following steps before said step B2:

performing channel decoding on the initial soft information sequence of the encoded bits of said copies of multiple user terminal data packets;

for user terminal data packets that is channel decoded incorrectly, performing the operations of said step B2, B3.

7. A method of forwarding data packets from multiple user terminals in a relay station of a wireless communication network, comprising:

receiving copies of multiple data packets from one or more user terminals, respectively;

performing network encoding processing on said copies of multiple data packets, to obtain a network encoded data packet; and sending said network encoded data packet to a base station;

wherein said network encoding processing comprises any one of the following:

performing multiplication transforming in the binary domain on at least one of multiple bit sequences obtained after performing channel decoding on said copies of multiple data packets, and then performing adding transforming processing in the binary domain with other bit sequences; and said network encoding comprises performing bitwise XOR or XNOR processing on multiple bit sequences after performing channel decoding on said copies of multiple data packets.

8. A decoding apparatus for decoding data packets from user terminals in a base station of a wireless communication network, comprising:

a first receiver of said base station operative to receive copies of multiple user terminal packets from one or more user terminals and a network encoded data packet from a relay station, wherein said network encoded data packet is obtained after said relay station performs network encoding on said copies of multiple user terminal packets respectively received from said one or more user terminals; and a soft combining and decoding unit of said base station operative to perform joint soft combining and decoding on said copies of multiple user terminal packets and said network encoded data packet.

9. A decoding apparatus for decoding data packets from user terminals in a base station of a wireless communication network, comprising:

a first receiver operative to receive copies of multiple user terminal packets from one or more user terminals and a network encoded data packet from a relay station, wherein said network encoded data packet is obtained after said relay station performs network encoding on said copies of multiple user terminal packets respectively received from said one or more user terminals; and a soft combining and decoding unit operative to perform joint soft combining and decoding on said copies of multiple user terminal packets and said network encoded data packet;

wherein said network encoded data packet is encoded by said relay station by multiplication transforming in the binary domain on at least one of multiple bit sequences obtained after performing channel decoding on said copies of multiple user terminal data packets received by said relay station, and then performing adding transforming processing in the binary domain with other bit sequences; or performing bitwise XOR or XNOR processing on the multiple bit sequences.

10. A decoding apparatus according to claim 9, wherein said soft combining and decoding unit comprises:

an obtaining unit operative to obtain an initial soft information sequence of encoded bit sequence of said network encoded data packet and an estimated soft information sequence of an encoded bit sequence or an initial soft information sequence of the encoded bit sequence of said copies of multiple user terminal packets;

a soft combining processing unit operative to perform joint soft combining processing on said initial soft information sequence of the encoded bit sequence of said network encoded data packet and said estimated soft information sequence of the encoded bit sequence or said initial soft information sequence of the encoded bit sequence of said copies of multiple user terminal packets, to obtain a soft combined bit likelihood ratio sequence of the bit sequence of at least one user terminal data packet of said multiple user terminal data packet; and a channel decoding unit operative to perform channel decoding on said soft combined bit likelihood ratio sequence.

11. A decoding apparatus according to claim 10, wherein said network encoding comprises performing bitwise XOR processing on multiple bit sequence obtained after performing channel decoding on said copies of multiple user terminal data packets, said soft combining processing unit is for:

performing soft combining processing according to equation $$L\tilde{L}R(b_1) = L\hat{L}R(b_1) + \log\frac{\sum_{oddc} e^{LLR(oddc)}}{\sum_{evenc} e^{LLR(evenc)}},$$

wherein $b_1$ is an encoded bit in a user terminal data packet, $L\tilde{L}R(b_1)$ is combined bit likelihood ratio after performing soft combining on the encoded bit, $L\hat{L}R(b_1)$ is an estimated bit likelihood ratio of the encoded bit, LLR(oddc) is a combination of an odd number of bit likelihood ratios out of estimated likelihood ratios $L\hat{L}R(b_2)$, $L\hat{L}R(b_3)$, $L\hat{L}R(b_m)$ of corresponding encoded bits $b_2, b_3, \ldots b_m$ of other user terminal data packets with which XOR processing is performed on the encoded bit $b_1$ and an initial bit likelihood ratio of corresponding encoded bit $b_{NC}$ in said network encoded data packet, $$\sum_{oddc} e^{LLR(oddc)}$$

is the sum of all e raised to the power of the combinations of odd numbers of bit likelihood ratios combinations, $b_{NC}=b_1 \oplus b_2 \oplus \ldots \oplus b_m$, m is the number of the user terminals; LLR(evenc) is a combination of an even number of bit likelihood ratios out of estimated likelihood ratios $L\hat{L}R(b_2)$, $L\hat{L}R(b_3)$, $L\hat{L}R(b_m)$ of corresponding encoded bits $b_2, b_3, \ldots b_m$ of the other user terminal data packets with which XOR processing is performed on the encoded bit $b_1$ and the initial bit likelihood ratio of the corresponding encoded bit $b_{NC}$ in said network encoded data packet, $$\sum_{evenc} e^{LLR(evenc)}$$

is the sum of all e raised to the power of the combinations of even numbers of bit likelihood ratios combinations.

12. A decoding apparatus according to claim 10, wherein said initial soft information of an encoded bit comprises an initial bit likelihood ratio of the encoded bit which is determined according to the following equation:

$$LLR(b_j) = \log\frac{P(b_j = 1 \mid y_{U1,B})}{P(b_j = 0 \mid y_{U1,B})}$$

$$= \log\left[\frac{\sum_{s_i:b_j=1} P(y_{U1,B} \mid s_i)}{\sum_{s_k:b_j=1} P(y_{U1,B} \mid s_k)}\right]$$

$$= \log\left[\frac{\sum_{s_i:b_j=1} \exp(LLR(s_i))}{\sum_{s_k:b_j=1} \exp(LLR(s_k))}\right]$$

wherein $LLR(b_j)$ is the initial bit likelihood ratio of the j-th bit in symbol s1, $y_{U1,B}=h_{U1,B} \cdot s_1 + n_{U1,B}$, $s_1$ is symbol sent by user terminal U1 or the relay station, $h_{U1,B}$ is channel transfer coefficient, $n_{U1,B}$ is noise; $s_i$ and $s_k$ are all possible values of symbol $s_1$.

13. A decoding apparatus according to claim 10, wherein said channel decoding unit is operative to:

perform channel decoding on the initial soft information sequence of the encoded bits of said copies of multiple user terminal data packets;

for user terminal data packets that is channel decoded incorrectly, perform soft combining processing by said soft combining processing unit and perform channel decoding on the bit likelihood sequence obtained after performing by said soft combining processing unit.

14. A forwarding apparatus for forwarding data packets from multiple user terminals in a relay station of a wireless communication network, comprising:

a receiver operative to receive copies of multiple data packets from one or more user terminals, respectively;

a network encoder operative to perform network encoding processing on said copies of multiple data packets, to obtain a network encoded data packet, said network encoding processing comprises any one of the following:

performing bitwise XOR or XNOR processing on multiple bit sequences after performing channel decoding on said copies of multiple data packets, and performing multiplication transforming in the binary domain on at least one of multiple bit sequences obtained after performing channel decoding on said copies of multiple data packets, and then performing adding transforming processing in the binary domain with other bit sequences; and a transmitter operative to send said network encoded data packet to a base station.

\* \* \* \* \*